_United States Patent Office_

3,590,101
Patented June 29, 1971

3,590,101
PROCESS FOR RECOVERING SUSPENSION POLYMERS
Robert B. McTaggart, Springfield, and Tevis Shusman, Longmeadow, Mass., assignors to Monsanto Company, St. Louis, Mo.
No Drawing. Filed Jan. 18, 1967, Ser. No. 610,032
Int. Cl. C08f 41/12
U.S. Cl. 260—876R
9 Claims

ABSTRACT OF THE DISCLOSURE

There is disclosed a process for recovering beads of polymer produced by suspension polymerization from an aqueous slurry of the beads wherein there is added to the slurry 0.01 to 1.2 percent by weight, based upon the weight of the polymer, of a polyethylene glycol having a molecular weight of about 200 to 6000. The aqueous medium is then removed, generally by centrifuging, and the beads are washed with water and dried. As a result of this process, the beads are substantially free from static charge so as to facilitate handling and retain upon their surface a minor amount of the polyalkylene glycol which imparts significant benefits in subsequent handling and processing.

BACKGROUND OF THE INVENTION

Many polymers are produced by suspension polymerization techniques, generally resulting in a slurry of the polymer beads in the aqueous medium containing suspending agents, salts and other materials employed to effect polymerization. Minor amounts of these materials tend to be adsorbed upon the surface of the beads and are desirably removed in large part by washing with water. It is customary to remove the aqueous medium and any water used for washing the beads and thereafter to dry the beads for storage, packaging or subsequent processing.

Many suspension polymers characteristically develop a static charge on the surface and thereby present problems in subsequent processing and particularly screening and classifying operations. Moreover, the static charge which may be developed by these polymers can produce difficulties from the standpoint of attraction of dust particles from the air or from the standpoint of blending other materials with them such as pigments and fillers.

The problems of static charge have often been recognized during compounding of the resin, and various chemical agents have been proposed as a means for treating the resinous products to minimize static charge. Gases such as ammonia and screening aids such as silica gel have also been proposed to facilitate screening and classifying of the polymer beads without significant success and with attendant difficulties.

It is an object of the present invention to provide a simple and highly effective method for recovering beads of suspension polymer from an aqueous slurry.

It is also an object to provide such a method which is relatively inexpensive and which provides further benefits from the standpoint of subsequent processing of the polymer.

Another object is to provide such a method which may be practiced in existing equipment without concern for contamination and which greatly facilitates handling and processing of the polymer beads.

SUMMARY OF THE INVENTION

It has now been found that the foregoing and related objects can be readily attained in a process for suspension polymerization of polymers which develop a static charge. In this process, the aqueous slurry of the polymer beads from the suspension polymerization reactor has admixed therewith polyethylene glycol having a molecular weight of 200 to 6000 in an amount of about 0.01 to 1.2 percent by weight, based upon the weight of the polymer beads. After the polyethylene glycol has been thoroughly admixed with the slurry so as to effect substantially uniform distribution therein, the aqueous medium is removed by centrifuging or the like, and the beads are washed and dried. The dried beads are substantially free from static charge and are found to retain a minor amount of polyethylene glycol dispersed on the surface thereof.

Although the theory of operation is not fully understood, it is believed that the minor amount of polyethylene glycol which is retained upon the surface of the polymer beads distributed the residual static charge which might otherwise be concentrated and prevents the accumulation of any charge during mechanical processing. In particular, it has been found that the present invention permits facile separation of the polymer beads into their several sizes and prevents blinding of the screens used for classification. In addition, the residual amount of polyethylene glycol upon the surface of the polymer beads may provide some benefit in subsequent processing thereof.

The polyethylene glycols

The polyethylene glycols are highly effective because they may be readily dispersed in water and are relatively low in cost. Generally, the polyethylene glycol has a molecular weight of about 200 to 6000, and preferably about 400 to 1500. With the higher molecular weight materials, it may be necessary to melt the material before attempting to disperse it or to add it to a volume of heated waer.

Experiments with varying amounts of polyethylene glycol have indicated that there is benefit to be obtained from the use of amounts varying from as little as about 0.01 percent by weight based upon the weight of the beads. Above about 1.2 percent by weight, the polyethylene glycol seems to provide little, if any, added benefit and the cost tends to become somewhat prohibitive. The preferred processes utilize 0.03 to 0.5 percent by weight of the polyethylene glycol and, most desirably, about 0.05 to 0.2 percent.

Admixing of the polyethylene glycol

The polyethylene glycol must be added to the polymer beads prior to completion of the washing thereof. In order to effect optimum dispersion and distribution upon the surface of the polymer beads, the polyethylene glycol is most desirably added to the polymerization slurry, i.e., the slurry of the polymer beads in the aqueous medium in which they have been suspended during polymerization. By agitation for a period of only a few minutes, substantially uniform distribution of the polyethylene glycol within the slurry can be effected with resultant distribution of minor amounts of polyethylene glycol upon the surface of the beads.

Alternatively, the original mother liquor from the suspension polymerization reaction may be drained in whole or in part, and the polyethylene glycol then admixed with the beads in only a portion of the original liquor or in another quantum of water added thereto. Addition of the polyethylene glycol with the wash water for the beads is not so advantageous since it does not permit optimum utilization of the processing facilities or optimum distribution of the polyethylene glycol upon the surface of the polymer beads.

Recovery and washing processes

Various techniques may be utilized for removing the water or mother liquor from the polymerization slurry.

The most advantageous processes utilize continuous or batch centrifuging techniques, most desirably contemporaneously with washing of the beads.

Alternatively, the polymer beads may be allowed to settle from the liquor of the slurry in a suitable vessel, and the mother liquor or wash liquor is decanted. In still another process, the polymerization slurry may be poured upon a suitable filter which allows the aqueous medium to pass therethrough, and the polymer beads are then washed while retained upon the surface of the filter In some instances, it is desirable to neutralize the aqueous slurry of the polymer beads prior to dewatering or removal of the mother liquor. It may be advantageous to add the polyethylene glycol to the neutralizing solution which is to be added to the slurry.

The amount of water utilized to wash the polymer beads should not be so extensive as to remove all of the polyethylene glycol from the surface thereof. Generally, the amount of water which should be utilized will vary with the technique of washing. When centrifuging with counter-current washing is employed, the amount of water may equal as much as three times the volume of polymer beads, but preferably is on the order of one to two times the volume thereof. When a soaking and decanting operation is employed, the volume of water should not exceed two times the volume of beads, and preferably is less than one and one-half the volume thereof. When flow of the washing water over the beads on a screen is employed, the volume may be as large as three times the volume of the beads, but is preferably only on the order of one to two times the volume.

After washing, the polymer beads are dried according to any conventional technique and screened or otherwise classified according to the desired process. If desired, they may be blended with other components such as additional lubricants, pigments, etc., for purposes of commercial products.

The polymers

The present invention is adapted to the treatment of various vinylidene polymers which are produced in suspension and which have a potential for developing a static charge. Among these polymers are vinyl halides such as vinyl chloride, vinyl bromide, etc.; vinylidene halides such as vinylidene chloride, vinylidene bromide, etc.; vinyl esters such as vinyl acetate, vinyl propionate, etc.; alkyl (alk)acrylates such as methyl(meth)acrylate, ethyl(meth)acrylate, butyl(meth)acrylate, etc.; conjugated 1,3-dienes such as butadiene, isoprene, etc.; monovinylidene aromatic monomers such as styrene, o-, m- and p-methylstyrenes, p-tert-butylstyrene, ardiethylstyrenes, and other aralkylstyrenes, alpha-methylstyrene, alpha-ethylstyrene, alpha-methyl-p-methylstyrene, and other alpha-alkylstyrenes, o- m- and p- chlorostyrenes, ar-dibromostyrenes, and other ar-halostyrenes, vinyl naphthalene, etc.; and mixtures thereof with one another and/or with one or more copolymerizable monomers such as a dialkyl maleate or fumarate, e.g., dimethyl maleate, diethyl maleate, dibutyl maleate, the corresponding fumarates, etc.; an alpha, beta-unsaturated mono-basic acid or derivative thereof, such as (meth)acrylic acid, (meth)acrylonitrile, (meth)acrylamide, N - tert - butyl(meth)acrylamide and other N-alkyl (meth)acrylamides, etc.

The polymers may also contain performed rubber components with the suspension being utilized to polymerize at least a portion of the monomers upon the preformed rubbery polymer. The preferred rubbers are diene rubbers, including conjugated 1,3-dienes, interpolymers of conjugated 1,3-dienes with one another and interpolymers of one or more conjugated 1,3-dienes with up to an equal amount by weight of one or more copolymerizable monoethylenically unsaturated monomers such as monovinylidene aromatic hydrocarbons such as styrene, unsaturated nitriles such as acrylonitrile, alkyl acrylates and methacrylates such as ethyl acrylate and methyl methacrylate, etc.

Of the various vinylidene polymers, the present invention has been found particularly advantageous for treating monovinylidene aromatic hydrocarbon polymers, i.e., polymers containing at least 30 percent by weight of a monovinylidene aromatic hydrocarbon monomer both with and without a preformed rubbery substrate upon which the monomer is grafted. From the standpoint of optimum properties, such polymers desirably contain acrylonitrile or methacrylonitrile with the monovinylidene aromatic hydrocarbon comprising 60 to 85 percent by weight of the interpolymer and the nitrile component comprising 40 to 15 percent by weight of the interpolymer.

Suspension polymerization processes

Various modifications in techniques may be utilized for polymerizing the monomers in suspension. In one technique, the monomers are initially suspended in water and polymerization entirely conducted in suspension with suspending agent, salts, and other components being added either entirely initially or as required during polymerization.

In another technique, the monomers are initially polymerized at partial conversion en masse, the degree of conversion usually being about 15 to 50 percent. This partially polymerized syrup is then suspended in water with the necessary suspending agents, salts and other materials being added either to the monomer formulation initially or during the suspension polymerization portion of the process.

Among the water-soluble and water-insoluble suspending agents used in preparing bead polymers are calcium, barium and magnesium phosphates; aluminum and magnesium hydroxides; calcium, ferric and magnesium carbonates; zinc sulfide; calcium fluoride; magnesium silicate; barium sulfate; zinc oxide, talc; kaolin, kieselguhr; polyvinyl alcohol; cellulose ethers such as methoxycellulose, sodium carboxymethylcellulose, etc.; water-soluble sulfonated polystyrenes and the alkali metal and ammonium salts thereof; water-soluble copolymers of acrylic acids such as water-soluble acrylic acid/2-ethylhexyl acrylate copolymers, water-soluble acrylic acid/n-dodecyl acrylate copolymers, water-soluble methacrylic acid/hexyl acrylate copolymers, and other water-soluble interpolymers of acrylic acid and/or methacrylic acid with a $C_6$–$C_{18}$ alkyl acrylate and/or a $C_6$–$C_{18}$ alkyl methacrylate, etc.

DESCRIPTION OF THE PREFERRED EMBODIMENTS

Illustrative of the efficacy of the present invention are the following specific examples wherein all parts are parts by weight unless otherwise indicated.

EXAMPLE ONE

A slurry of polymer beads is prepared by polymerizing 100 parts of a mixture of styrene and acrylonitrile monomers (70:30) in suspension in 100 parts of water. The suspending agent system utilizes as the suspending agent a copolymer of 2-ethylhexyl acrylate and acrylic acid containing 95 mol percent of combined acrylic acid and sodium chloride.

The slurry of the polymer beads is transferred to a slurry hold tank wherein it is stirred and there is added thereto 0.05 part, based upon 100 parts of polymer beads, of polyethylene glycol having a molecular weight of about 400. The polyethylene glycol dissolves in the water of the slurry and the resulting mixture is stirred during the hold period for the slurry which is greater than three hours.

This slurry is then transferred to a centrifuge wherein the water is removed while the beads are simultaneously washed with a countercurrent flow of water in a 1:1 volume ratio. The water contains no surface active agents.

The washed beads are then dried in a rotary drier and screened in a shaker-type classifying apparatus while still hot from the drier.

No blinding of the screens of the classifying apparatus is observed, and the fines process readily. During subsequent processing of the polymer beads, no effect of static charge is observed.

In contrast, beads which are not admixed with polyethylene glycol subjected to similar processing are found to exhibit a high static charge and to blind the screens of the classifying apparatus. Spraying of polyethylene glycol upon the dried beads prior to classification does not prevent blinding of the screens.

EXAMPLE TWO

The process of Example One is substantially repeated utilizing laboratory facilities and beads of styrene homopolymer. Similar benefits are obtained during handling and processing.

EXAMPLE THREE

The process of Example Two is substantially repeated utilizing polyethylene glycol having a molecular weight of 200. Similar results are obtained.

EXAMPLE FOUR

The process of Example Two is substantially repeated utilizing polyethylene glycol having a molecular weight of about 4000. Similar results are obtained.

EXAMPLE FIVE

The process of Example Two is substantially repeated utilizing 1.0 part by weight of polyethylene glycol having a molecular weight of about 400. While the beads are being heated in the drying operation, a vacuum tube electrometer is utilized to determine the presence of any static charge and none is found. Measurement of the static charge of the polymer beads retained on the several screens of the classifying apparatus also indicates that there is no residual charge.

EXAMPLE SIX

The process of Example Two is substantially repeated using beads of vinyl chloride homopolymer. Similar results are obtained.

EXAMPLE SEVEN

The process of Example Two is substantially repeated using beads of a composition comprising a polyblend of a graft copolymer of styrene/acrylonitrile upon a butadiene substrate with a copolymer of styrene and acrylonitrile. Similar results are obtained.

From the foregoing specification and examples, it can be seen that the process of the present invention affords significant benefits in eliminating or minimizing the static charge which develops upon the surface of the polymer beads during handling and processing. As a result, the screening and handling of fine polymer beads is greatly facilitated and difficulties in operation of the processing equipment may be significantly reduced. Moreover, the residual film of polyethylene glycol remaining upon the surface of the beads may provide some advantages in the subsequent forming and blending operations.

Having thus described the invention, we claim:

1. In a process for recovering beads of vinylidene polymer produced by suspension polymerization from a slurry of the beads in an aqueous medium, the steps comprising: adding to a slurry of polymer beads 0.01 to 1.2 percent by weight, based upon the weight of the beads, of polyethylene glycol having a molecular weight of about 200 to 6000; removing the aqueous medium from said slurry; washing said beads with water having a volume not greater than three times the volume of said beads; and thereafter drying said beads, said dried beads being substantially free from static charge and having a minor amount of said polyethylene glycol dispersed on the surface thereof.

2. The process of claim 1 wherein said polyethylene glycol has a molecular weight of about 400 to 1500.

3. The process of claim 1 wherein said polymer includes a monovinylidene aromatic hydrocarbon.

4. The process of claim 1 wherein said volume of water is not more than two times the volume of said beads.

5. The process of claim 1 wherein said aqueous medium is removed by centrifuging and said washing is conducted contemporaneously by flowing the water countercurrent to the flow of beads.

6. The process of claim 1 wherein said polymer is a polyblend with a graft copolymer having a rubber substrate with a monovinylidene aromatic hydrocarbon polymer superstrate grafted thereon.

7. The process of claim 6 wherein said monovinylidene aromatic hydrocarbon polymer is a copolymer of 60 to 85 percent by weight styrene and 40 to 15 percent by weight acrylonitrile.

8. The process of claim 1 wherein said polymer is an interpolymer containing 60 to 85 percent by weight of styrene and 40 to 15 percent by weight of acrylonitrile.

9. The process of claim 1 wherein said polymer contains at least 30 percent by weight of a monovinylidene aromatic hydrocarbon monomer and wherein said polyethylene glycol is added in an amount of about 0.03 to 0.2 percent by weight and has a molecular weight of about 400 to 1500 and wherein said volume of water is not more than two times the volume of said beads.

References Cited

UNITED STATES PATENTS

| | | | |
|---|---|---|---|
| 2,393,863 | 1/1946 | Myers | 260—ANTI-STAT. |
| 3,248,455 | 4/1966 | Harsch et al. | 260—876 |
| 3,249,569 | 5/1966 | Fantl | 260—880 |
| 3,258,453 | 6/1966 | Chi | 260—93.5A |
| 3,346,520 | 10/1967 | Lee | 260—880X |
| 3,356,644 | 12/1967 | Lee | 260—45.95 |

FOREIGN PATENTS

| | | | |
|---|---|---|---|
| 650,391 | 1/1965 | Belgium | 260—876 |
| 921,032 | 3/1963 | Great Britain | 260—ANTI-STAT. |

OTHER REFERENCES

Watson—Effective Approach to Antistatic Polystyrene—British Plastics, May 1963, p. 251.

MURRAY TILLMAN, Primary Examiner

C. J. SECCURO, Assistant Examiner

U.S. Cl. X.R.

117—100A; 260—28.5A, 28.5B, 34.2, 880R, 897B, DIG19